US010370551B2

(12) United States Patent
Watanabe et al.

(10) Patent No.: US 10,370,551 B2
(45) Date of Patent: Aug. 6, 2019

(54) INK COMPOSITION AND RECORDING METHOD

(71) Applicant: Seiko Epson Corporation, Tokyo (JP)

(72) Inventors: Tadashi Watanabe, Shiojiri (JP); Takayoshi Kagata, Shiojiri (JP); Akira Mizutani, Matsumoto (JP); Kenichi Seguchi, Okaya (JP); Akiko Matsuzaki, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/371,495

(22) Filed: Dec. 7, 2016

(65) Prior Publication Data

US 2017/0166767 A1 Jun. 15, 2017

(30) Foreign Application Priority Data

Dec. 10, 2015 (JP) ................................. 2015-241455
Oct. 31, 2016 (JP) ................................. 2016-212638

(51) Int. Cl.
| | |
|---|---|
| *B41J 2/16* | (2006.01) |
| *C09D 11/54* | (2014.01) |
| *C09D 11/322* | (2014.01) |
| *C09D 11/033* | (2014.01) |
| *C09D 11/107* | (2014.01) |

(52) U.S. Cl.
CPC ............ *C09D 11/54* (2013.01); *C09D 11/033* (2013.01); *C09D 11/107* (2013.01); *C09D 11/322* (2013.01)

(58) Field of Classification Search
None
See application file for complete search history.

(56) References Cited

U.S. PATENT DOCUMENTS

| | | | | | |
|---|---|---|---|---|---|
| 4,943,612 | A | * | 7/1990 | Morita | .................... C04B 24/26 524/714 |
| 2006/0061640 | A1 | * | 3/2006 | Doi | ........................ C09D 11/30 347/100 |
| 2015/0274998 | A1 | * | 10/2015 | Kagata | ................. C09D 11/107 347/102 |

FOREIGN PATENT DOCUMENTS

JP 2013-204025 A 10/2013

* cited by examiner

*Primary Examiner* — Erica S Lin
(74) *Attorney, Agent, or Firm* — Harness, Dickey & Pierce, P.L.C.

(57) ABSTRACT

Provided is an ink composition that includes a color material, water, an organic solvent, and polymer particles, the organic solvent including an organic solvent with a standard boiling point of equal to or greater than 150° C. and equal to or less than 250° C., the content of the organic solvent that is an alkyl polyol with a standard boiling point of equal to or greater than 280° C. being equal to or less than 2.0% by mass with respect to a total amount of the ink composition, the polymer particles having a core-shell structure including core polymer and shell polymer, and a glass transition temperature of the shell polymer being higher than that of the core polymer, and that is used for a recording method using the ink composition and an aggregating liquid containing an aggregating agent capable of aggregating components of the ink composition and increasing viscosity of the components.

16 Claims, 1 Drawing Sheet

INK COMPOSITION AND RECORDING METHOD

BACKGROUND

1. Technical Field

The present invention relates to an ink composition and a recording method.

2. Related Art

An ink jet recording method can realize recording of a high-resolution image with a relatively simple apparatus and has rapidly been developed in various fields. In such a circumstance, various studies have been conducted to more stably obtain a recorded material with high quality.

For example, JP-A-2013-204025 discloses an ink jet ink, which is used with a reaction solution for hardening the ink jet ink and contains water, a water-soluble organic solvent, a coloring agent, and a binder resin, and in which the binder resin is formed of a core portion and a shell portion that covers the core portion, a reactive group that reacts with the reaction solution is contained on the surface of the shell portion, and a minimum filming temperature (MFT) of the shell portion is higher than the MFT of the core portion, for the purpose of providing ink with an excellent drying property for speed printing and with preservation stability.

The ink composition as disclosed in JP-A-2013-204025 is used with a reaction solution, and it is possible to obtain a drying property of the ink composition to some extent by containing a specific binder resin. The ink composition also exhibits excellent ejection stability by containing the specific binder resin. However, such an ink composition cannot obtain the drying property in a higher level after landing on a recording medium since the content of an alkyl polyol with a standard boiling point of equal to or greater than 280° C. exceeds a predetermined amount, sufficient abrasion resistance cannot be obtained, and bleeding may occur in an obtained recorded material.

SUMMARY

A first advantage of some aspects of the invention is to provide an ink composition that maintains excellent ejection stability, exhibits excellent abrasion resistance, and suppresses bleeding of a recorded material in a case where an aggregating liquid and the ink composition are made to adhere to a recording medium. A second advantage of some aspects of the invention is to provide a recording method that maintains excellent ejection stability and suppresses bleeding of a recorded material in a case where an aggregating liquid and an ink composition are made to adhere to a recording medium at a temperature of 38° C. or less. Bleeding is a state where an unclear image is obtained since ink between ink droplets flows together when the ink droplets of the ink composition, which have adhered to the recording medium in a dot shape, are brought into contact with each other and a state where a further unclear image is obtained due to mixing of colors between dots in a case where the ink droplets have ink compositions for mutually different colors.

The inventors discovered as a result of intensive studies for solving the problem that excellent ejection stability, abrasion resistance, and image quality are achieved by using an ink composition, which contains a color material, water, an organic solvent, and polymer particles, and in which the organic solvent contains an organic solvent with a standard boiling point within a predetermined range, the content of the organic solvent that is an alkyl polyol is equal to or less than a predetermined amount, the polymer particles have a core-shell structure including core polymer and shell polymer, and a glass transition temperature of the shell polymer is higher than a glass transition temperature of the core polymer, for a recording method using the ink composition and an aggregating liquid containing an aggregating agent that is capable of aggregating components of the ink composition or increasing viscosity of the components of the ink composition, and the inventors completed the invention.

According to an aspect of the invention, there is provided an ink composition including: a color material; water; an organic solvent; and polymer particles, in which the organic solvent includes an organic solvent with a standard boiling point of equal to or greater than 150° C. and equal to or less than 250° C., and the content of the organic solvent that is an alkyl polyol with a standard boiling point of equal to or greater than 280° C. is equal to or less than 2.0% by mass with respect to a total amount of the ink composition, in which the polymer particles have a core-shell structure including core polymer and shell polymer, and a glass transition temperature of the shell polymer is higher than a glass transition temperature of the core polymer, and in which the ink composition is used for a recording method using the ink composition and an aggregating liquid containing an aggregating agent that is capable of aggregating components of the ink composition or increasing viscosity of the components of the ink composition. The reason that such an ink composition can solve the problem of the invention is considered as follows. However, the reason is not limited thereto. That is, the ink composition according to the invention exhibits excellent ejection stability since welding (a state where the ink composition adheres to the surface and cannot easily be removed; sticking) of the polymer particles to an ink jet head is suppressed in a case of being used for a recording method using the ink composition and the aggregating liquid, mainly by containing the polymer particles in which the glass transition temperature of the shell polymer is higher than the glass transition temperature of the core polymer. Also, the ink composition according to the invention exhibits excellent abrasion resistance mainly because the core polymer in the polymer particles that have landed on the recording medium flows due to impact at the time of the landing or heating. Also, the ink composition also exhibits further improved abrasion resistance and suppresses bleeding of the recording material mainly because, the standard boiling point of the organic solvent is equal to or greater than 150° and equal to or less than 250° C., the content of the alkyl polyol with the standard boiling point of equal to or greater than 280° C. is equal to or less than 2.0% by mass with respect to the total mass of the ink composition, and the drying property of the ink composition that has landed on the recording medium is improved.

In the ink composition according to the invention, it is preferable that the content of the organic solvent with the standard boiling point of equal to or greater than 280° C. be equal to or less than 0.5% by mass with respect to the total mass of the ink composition. It is preferable that the acid value of the shell polymer be higher than the acid value of the core polymer. It is preferable that at least one of the conditions that the acid value of the shell polymer is equal to or greater than 20 mgKOH/g and that the acid value of the core polymer is equal to or less than 15 mgKOH/g be satisfied. It is preferable that the shell polymer contain at least an aromatic monomer unit as a constitutional unit. It is further preferable that the difference between the glass transition temperature of the core polymer and the glass transition temperature of the shell polymer be equal to or greater than 10° C. It is preferable that the aggregating agent be one kind or two or more kinds selected from a group consisting of polyvalent metal salts, organic acids, and cationic compounds.

Furthermore, according to another aspect of the invention, there is provided a recording method including: causing the ink composition to adhere to a recording medium; and causing an aggregating liquid containing an aggregating agent that is capable of aggregating components of the ink composition or increasing viscosity of the components of the ink composition to adhere to the recording medium. It is preferable that the causing of the ink composition to adhere be causing at least the ink composition to adhere to the recording medium by an ink jet method. It is preferable that the causing of the ink composition to adhere to the recording medium be causing the ink composition to adhere to a heated recording medium.

According to still another aspect of the invention, there is provided a recording method including: causing an aggregating liquid containing an aggregating agent that is capable of aggregating components of an ink composition or increasing viscosity of the components of the ink composition to adhere to a recording medium; and causing the ink composition that contains a color material, water, an organic solvent, and polymer particles to adhere to the recording medium with a surface temperature of equal to or less than 38° C., wherein in the ink composition, the organic solvent includes an organic solvent with a standard boiling point of equal to or greater than 150° C. and equal to or less than 250° C., and the content of the organic solvent that is the alkyl polyol with a standard boiling point of equal to or greater than 280° C. is preferably equal to or less than 0.5% by mass with respect to a total amount of the ink composition. It is preferable that the polymer particles contain at least an aromatic monomer unit as a constitutional unit.

In the recording method according to the aspect of the invention, it is preferable that the causing of the ink composition to adhere to the recording medium be causing the ink composition to adhere to a recording medium heated to a temperature from 30° C. to 50° C.

BRIEF DESCRIPTION OF THE DRAWING

The invention will be described with reference to the accompanying drawings, wherein like numbers reference like elements.

DESCRIPTION OF EXEMPLARY EMBODIMENTS

Figure 1:
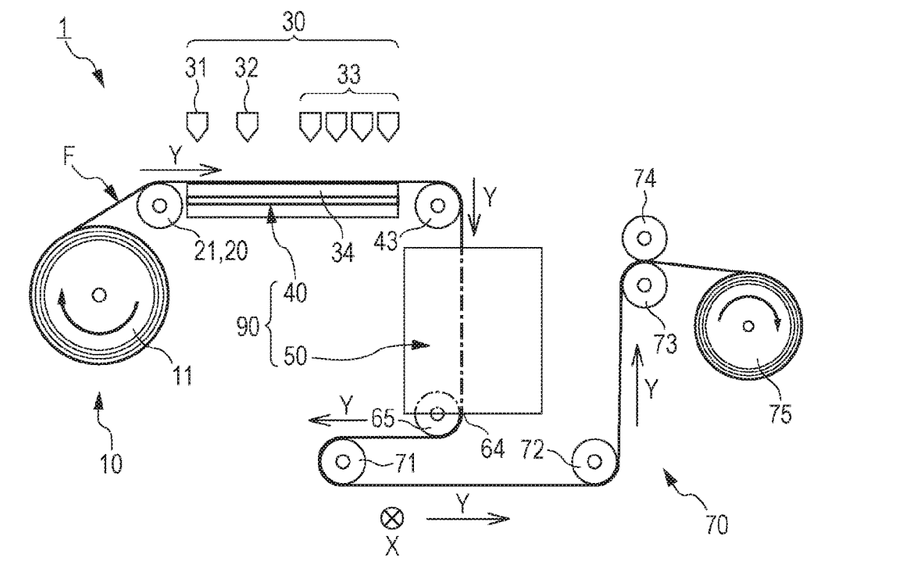
FIGURE is a side view illustrating an overall outline of an example of an ink jet recording apparatus that can be used in an embodiment.

Hereinafter, a detailed description will be given of an embodiment of the invention (hereinafter, referred to as "the embodiment") with reference to the drawing as needed. However, the invention is not limited thereto, and various modifications can be made without departing from the gist thereof. Same reference numerals are given to the same elements in the drawing, and description is not repeated. Vertical and horizontal positional relationships are based on positional relationships illustrated in the drawing unless otherwise particularly stated. Dimensional ratios in the drawing are not limited to those illustrated.

Ink Composition

An ink composition according to the embodiment includes a color material, water, an organic solvent, and polymer particles and is used for a recording method using the ink composition and an aggregating liquid containing an aggregating agent that is capable of aggregating components of the ink composition or increasing viscosity of the components of the ink composition. The organic solvent includes an organic solvent with a standard boiling point of equal to or greater than 150° C. and equal to or less than 250° C., and the content of the organic solvent that is the alkyl polyol with a standard boiling point of equal to or greater than 280° is equal to or less than 2.0% by mass with respect to the total amount of the ink composition. Furthermore, the polymer particles have a core-shell structure including core polymer and shell polymer, and a glass transition temperature of the shell polymer is higher than a glass transition temperature of the core polymer. By using such an ink composition for the recording method using the ink composition and the aggregating liquid containing the aggregating agent that is capable of aggregating the components of the ink composition or increasing the viscosity of the components of the ink composition, abrasion resistance and image quality (bleeding suppression) of a recorded material obtained are improved while excellent ejection stability is maintained. The ink composition according to the embodiment exhibits excellent glossiness as well as excellent ejection stability, abrasion resistance, and image quality (suppression of bleeding).

Color Material

As the color material, a pigment can be used. The pigment is not particularly limited, and examples thereof include the following pigments.

Although not particularly limited, examples of carbon black used in black ink include No. 2300, No. 900, MCF88, No. 33, No. 40, No. 45, No. 52, MA7, MA8, MA100, No. 2200B, and the like (all of which are manufactured by Mitsubishi Chemical Corporation), Raven 5750, Raven 5250, Raven 5000, Raven 3500, Raven 1255, Raven 700, and the like (all of which are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all of which are manufactured by CABOT JAPAN K.K.), Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all of which are manufactured by Degussa).

Although not particularly limited, examples of a pigment used in white ink include C.I. Pigment White 6, 18, and 21, titanium oxide, zinc oxide, zinc sulfide, antimony oxide, zirconium oxide, white hollow resin particles, and polymer particles.

Although not particularly limited, examples of a pigment used in yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Although not particularly limited, examples of a pigment used in magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Although not particularly limited, examples of a pigment used in cyan ink include C.I. Pigment Blue 1, 2, 3, 15, 15:1, 15:2, 15:3, 15:34, 15:4, 16, 18, 22, 25, 60, 65, and 66 and C.I. Vat Blue 4 AND 60.

Although not particularly limited, examples of other pigments include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The color material preferably contains one kind of pigment or two or more kinds of pigments selected from a group consisting of self-dispersion-type pigments and polymer-dispersion-type pigments. In doing so, excellent glossiness tends to be achieved since the color material is uniformly dispersed in the recorded material.

The self-dispersion-type pigments are pigments that have a hydrophilic group on the surface thereof. The hydrophilic group is preferably at least one kind selected from a group consisting of —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$.

In these formulae, M represents a hydrogen atom, alkali metal, ammonium, a phenyl group that may have a substituent, or organic ammonium, and R represents an alkyl group containing 1 to 12 carbon atoms or a naphthyl group that may have a substituent. M and R are respectively independently selected.

Specifically, the self-dispersion-type pigments are manufactured by performing physical processing and/or chemical processing on the pigment and binding (grafting) the hydrophilic group to the surface of the pigment. Specific examples of the physical processing include vacuum plasma processing. Specific examples of the chemical processing include a wet oxidation method of performing oxidation in water with an oxidant and a method of binding a carboxyl group via a phenyl group by binding a p-aminobenzoic acid to the surface of the pigment.

The aforementioned polymer-dispersion-type pigment is a pigment that can be dispersed in a liquid by polymer. The content of the polymer with respect to the pigment can be represented as coverage of polymer that covers the pigment. The coverage of the polymer is preferably equal to or greater than 1.0% and equal to or less than 50%, is more preferably equal to or greater than 1.0% and equal to or less than 10%, and further preferably equal to or greater than 1.0% and equal to or less than 5.0%. The coverage of equal to or greater than 1.0% tends to lead to satisfactory dispersibility. Also, the coverage of equal to or less than 50% tends to lead to a further satisfactory color developing property, and the coverage of equal to or less than 5.0% tends to lead to a still further satisfactory color developing property.

In the polymer, 70% by mass or more of the components is preferably polymer obtained by copolymerization of (meth)acrylate and a (meth)acrylic acid. This tends to lead to a further excellent ink fixing property and glossiness. In addition, at least one of alkyl (meth)acrylate containing 1 to 24 carbon atoms and cyclic alkyl (meth)acrylate containing 3 to 24 carbon atoms is obtained by polymerization of 70% by mass or more of a monomer component. Specific examples of the monomer component include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. Other examples of the monomer component for the polymerization also include hydroxy (meth)acrylate, urethane (meth)acrylate, epoxy (meth)acrylate, and the like that has a hydroxyl group, such as hydroxyethyl (meth)acrylate, hydroxypropyl (meth)acrylate, and diethylene glycol (meth)acrylate. In the specification, "(meth)acrylate)" is a concept that includes both "methacrylate" and "acrylate".

In the ink composition, the content of the color material is preferably equal to or greater than 0.2% by mass and equal to or less than 10% by mass, more preferably equal to or greater than 0.5% by mass and equal to or less than 5.0% by mass, and further preferably equal to or greater than 1.0% by mass and equal to or less than 3.0% by mass with respect to the total amount (100% by mass) of the ink composition. The content of the color material within the above range tends to lead to a further improvement in the color developing property.

Water

Examples of the water in the embodiment include pure water such as ion-exchanged water, water obtained by ultrafiltration, water obtained by reverse osmosis, and distilled water and ultrapure water from which ionic impurities have been removed as much as possible. Use of water sterilized by irradiation with an ultraviolet ray, addition of hydrogen peroxide can prevent occurrence of mold and bacteria in a case here the aggregating liquid is preserved for a long period of time. This tends to lead a further improvement in preservation stability. The content of the water in the ink composition preferably ranges from 40 to 97% by mass, further preferably ranges from 45 to 90% by mass, and further preferably ranges from 50 to 80% by mass. The ink composition according to the embodiment is preferably a water-based ink composition that contains at least water as a main solvent component contained in terms of an excellent ink drying property on a recording medium and low burden on the environment.

Organic Solvent

The organic solvent according to the embodiment includes an organic solvent with a standard boiling point of equal to or greater than 150° C. and equal to or less than 250° C., and preferably includes an organic solvent with a standard boiling point of equal to or greater than 180° C. and equal to or less than 250° C.

Also, the content of the organic solvent that is the alkyl polyol with a standard boiling point of equal to or greater than 280° C. is equal to or less than 2.0% by mass, preferably equal to or less than 1.0% by mass, further preferably equal to or less than 0.5% by mass, and still further preferably equal to or less than 0.2% by mass with respect to the total amount of the ink composition. In doing so, it is possible to obtain excellent abrasion resistance and image quality (suppression of bleeding) since the drying property of the ink composition that has landed on the recording medium can be obtained in a higher level.

Although not particularly limited, examples of a type of the organic solvent includes cyclic nitrogen compounds, non-protonic polar solvents, monoalcohols, alkyl polyols, and glycol ether. For the organic solvent according to the embodiment, various organic solvent with a standard boiling point of equal to or greater than 150° C. and equal to or less than 250° C. can be appropriately selected and used from among these organic solvents. Although the ink composition preferably does not contain the organic solvent that is the alkyl polyol with a boiling point of equal to or greater than 280° C., it is only necessary that the content thereof is equal to or less than 2.0% by mass, and the content thereof is preferably equal to or less than 1.0% by mass, further preferably equal to or less than 0.5% by mass, and still further preferably equal to or less than 0.2% by mass with respect to the total amount of the ink composition. Furthermore, the ink composition more preferably does not contain the organic solvent (all the organic solvent exclusively including the alkyl polyol mentioned above) with the standard boiling point of equal to or greater than 280° C. from the viewpoints of abrasion resistance and glossiness. The content thereof is further preferably equal to or less than 2.0% by mass, more preferably equal to or less than 1.0% by mass, more preferably equal to or less than 0.5% by mass, and further more preferably equal to or less than 0.2% by mass with respect to the total amount of the ink composition. Furthermore, the content of the organic solvent with a standard boiling point of greater than 250° C. is more preferably within the above range. For example, the content thereof is more preferably equal to or less than 2.0% by mass, and further preferably equal to or less than 0.2% by mass with respect to the total amount of the ink composition.

The organic solvent preferably contains at least one of a cyclic nitrogen compound and a non-protonic polar solvent. By containing the cyclic nitrogen compound or the non-protonic polar solvent, the ink composition can shift an apparent glass transition temperature of the polymer particles toward the lower temperature side, and the core polymer and the shell polymer can be softened at a lower temperature than a typical temperature. Therefore, the fixing property of the ink composition to the recording medium tends to be improved. In doing so, it is possible to improve the fixing property of the ink composition to the recording medium in a case where the recording medium is made of polyvinyl chloride, in particular.

Although not particularly limited, examples of the non-protonic polar solvent include cyclic ketone compounds, chain ketone compounds, and chain nitrogen compounds. Representative examples of the cyclic nitrogen compound and the non-protonic polar solvent include pyrolidone-based solvents, imidazolidinone-based solvents, sulfoxide-based solvents, lactone-based solvents, and amide ether-based solvents. Specifically, 2-pyrolidone, N-alkyl-2-pyrolidone, 1-alkyl-2-pyrolidone, γ-butyrolactone, 1,3-dimethyl 2-imidazolidinone, dimethylsulfoxide, imidazole, 1-methylimidazole, 2-methylimidazole, and 1,2-dimethylimidazole are preferably used among the examples.

Although not particularly limited, examples of monoalcohols include methanol, ethanol, n-propyl alcohol, isopropyl alcohol, n-butanol, 2-buthanol, tert-butanol, iso-butanol, n-pentanol, 2-pentanol, 3-pentanol, and tert-pentanol.

Although not particularly limited, examples of alkyl polyols include glycerin, ethylene glycol, diethylene glycol, triethylene glycol, propylene glycol (1,2-propanediol), dipropylene glycol, 1,3-propylene glycol (1,3-propanediol), isobutylene glycol (2-methyl 1,2-propanediol), 1,2-butanediol, 1,3-butanediol, 1,4-butanediol, 2-butene 1,4-diol, 1,2-pentanediol, 1,5-pentanediol, 2-methyl 2,4-pentanediol, 1,2-hexanediol, 1,6-hexanediol, 2-ethyl 1,3-hexanediol, 1,7-heptanediol, and 1,8-octanediol.

Although not particularly limited, examples of glycol ether include diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-buthyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

The content of the organic solvent is preferably equal to or greater than 5.0% by mass to 50% by mass, more preferably equal to or greater than 10% by mass and equal to or less than 30% by mass, and further preferably equal to or greater than 13% by mass and equal to or less than 25% by mass with respect to the total amount (100% by mass) of the ink composition. The content of the organic solve that is equal to or less than 50% by mass tends to lead to a further improvement in the drying property of the ink composition that has adhered to the recording medium. The content of the organic solvent that is equal to or greater than 5.0% by mass tends to be able to secure the ejection stability of the ink composition. Furthermore, the content of the organic solvent with a standard boiling point of equal to or greater than 150° C. and equal to or less than 250° C. is within the above range, and the content of the organic solvent with a standard boiling point of equal to or greater than 180° C. and equal to or less than 250° C. is within the above range.

Polymer Particles

The polymer particles according to the embodiment have a core-shell structure including core polymer and shell polymer, and a glass transition temperature of the shell polymer is higher than a glass transition temperature of the core polymer. In doing so, shell resin is not easily solved, and the polymer particles are prevented from being welded, and excellent ejection stability can be obtained. Also, a film of core resin can easily be formed when the recording medium is heated after the adhesion process, and excellent abrasion resistance of the recorded material can be obtained. Thus, it is possible to comprehensively obtain both excellent ejection stability and abrasion resistance of the ink composition. In this regard, it is advantageous that Tg of the core polymer is set to be lower and Tg of the shell polymer is set to be higher.

The "core-shell structure" means a structure in which core polymer is formed inside an air gap of shell polymer. Therefore, the core-shell structure includes not only a structure in which the shell polymer covers the surface of the core polymer but also a structure in which a part inside an air gap of a three-dimensional net structure of the shell polymer is filled with the core polymer. Accordingly, the "core-shell structure" described herein includes polymer particles with boundaries between core portions and shell portions that are not strictly clear. However, the polymeric particles according to the embodiment used in a second recording method, which will be described later, are not limited to the polymer particles with the core-shell structure, may be single-layered particles containing only one kind of polymer, or may be particles (with no core-shell structure) containing a mixture of two or more kinds of polymer. It is a matter of course that the polymer particles according to the embodiment that is used in the second recording method may be polymer particles with a core-shell structure. Examples of the polymer particles other than the polymer particles with the core-shell structure include polymer particles made only of the aforementioned core resin or shell resin. In addition, examples of the kind of resin forming the polymer particles (the polymer particles with the core-shell structure and the polymer particles other than the polymer particles with the core-shell structure) include resin that contains at least (meth)acryl monomer as a constitutional unit, polyurethane resin, polyether resin, polyester resin, and composite resin thereof.

The glass transition temperature of the core polymer is preferably equal to or greater than 0° C. and less than 60° C. Since the glass transition temperature of the core polymer is less than 60° C. and the core polymer can easily flow out after softening of the shell polymer, excellent abrasion resistance tends to be obtained. Also, since the glass transition temperature of the core polymer is equal to or greater than 0° C., excellent preservation stability of the ink composition tends to be obtained.

The glass transition point (hereinafter, also referred to as "Tg") is measured by differential scanning calorimetry (DSC). Specifically, the measurement is performed by the method described in the embodiment which will be described later. In addition, a value calculated from Tg of homopolymer of known polymerizable monomer by using an equation can be used as an index for controlling the glass transition point. In a case where resin contained in the core polymer and the shell polymer, which will be described later, are copolymer, the glass transition temperature (Tg) of the copolymer can be calculated by the following FOX equation of Tgn (unit: K) of various kinds of homopolymer and a mass fraction (Wn) of monomer.

$$\frac{1}{Tg} = \frac{W_1}{Tg_1} + \frac{W_2}{Tg_2} + \dots + \frac{W_n}{Tg_n}$$

Here, Wn represents a mass fraction of the monomer, Tgn represents Tg (unit: K) of homopolymer of monomer, Tg represents Tg (unit: K) of copolymer).

In other words, the glass transition point of the core polymer or the shell polymer can be controlled by selecting homopolymer in the case where the polymer is homopolymer. In a case where the polymer is copolymer, the glass transition point can be controlled by taking account of (performing calculation by using) Tg of the homopolymer and the FOX equation. For example, resin may be designed by the aforementioned equation, actual Tg of the produced resin is measured, feeding-back and resigning may be performed such that the actual Tg approaches targeted Tg.

It is more preferable that the core polymer do not have an acid value. In addition, the core polymer preferably contains at least an aromatic monomer unit as a constitutional unit. In doing so, the core polymer becomes more hydrophobic than polymer that does not contain an aromatic monomer unit. Therefore, it is possible to form a more hydrophobic film on the recording medium. As a result, it tends to be possible to further improve the abrasion resistance of the recorded material. Here, the "constitutional unit" means a unit that forms the polymer, and a "monomer unit" means a constitutional unit derived from the monomer. Although not particularly limited, the acid value of the core polymer is preferably equal to or greater than 0 mgKOH/g and equal to or less than 20 mgKOH/g, more preferably equal to or greater than 0 mgKOH/g and equal to or less than 15 mgKOH/g, and further preferably equal to or greater than 0 mgKOH/g and equa to or less than 13 mgKOH/g.

Although not particularly limited, examples of aromatic monomer include styrene, α-methylstyrene, p-methylstyrene, vinyltoluene, chlorostyrene, and divinylbenzene.

Although not particularly limited, the core polymer preferably contains at least any of a hydrophilic (meth)acrylate monomer unit, a hydrophobic (meth)acrylate monomer unit that has an alkyl group containing 3 or more carbon atoms, a hydrophobic (meth)acrylate monomer unit with a cyclic structure, a (meth)acrylamide monomer unit or N-derivative substitution unit thereof, and a carboxylic acid monomer unit as a constitutional unit.

Although not particularly limited, examples of the hydrophilic (meth)acrylate monomer include methyl (meth)acrylate, ethyl (meth)acrylate, α-hydroxymethyl (meth)acrylate, 2-hydroxyethyl (meth)acrylate, (poly)ethylene glycol (meth)acrylate, methoxy (poly)ethylene glycol (meth)acrylate, ethoxy (poly)ethylene glycol (meth)acrylate, and (poly) propylene glycol (meth)acrylate. Among these examples, methyl (meth)acrylate and ethyl (meth)acrylate are preferably used. Here, "hydrophilic" means that solubility with respect to 100 mL of water (20° C.) is equal to or greater than 0.3 g. The core polymer containing hydrophilic (meth) acrylate monomer as a monomer unit tends to leads to excellent polymerization reactivity when the core polymer is manufactured.

Although not particularly limited, examples of the hydrophobic (meth)acrylate monomer that has an alkyl group containing 3 or more carbon atoms include (meth)acrylate that has an alkyl group containing 3 or more carbon atoms, such as n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, 2-ethylhexyl (meth)acrylate, n-octyl (meth)acrylate, nonyl (meth)acrylate, decyl (meth)acrylate, lauryl (meth) acrylate, stearyl (meth)acrylate, cetyl (meth)acrylate, neopentyl (meth)acrylate, and behenyl (meth)acrylate. Among these examples, lauryl (meth)acrylate is preferably used. Here, "hydrophobic" means that solubility with respect to 100 mL of water (20° C.) is less than 0.3 g.

Although not particularly limited, examples of the hydrophobic (meth)acrylate monomer that has a cyclic structure includes cyclohexyl (meth)acrylate, dicyclopentanyl (meth) acrylate, dicyclopentenyl (meth)acrylate, dicyclopentenyloxyethyl (meth)acrylate, isobornyl (meth)acrylate, norbornyl (meth)acrylate, adamantly (meth)acrylate, and tetrahydrofurfuryl (meth)acrylate.

Although not particularly limited, examples of (meth) acrylamide monomer and an N-derivative substitution thereof include (meth) acrylamide or N-derivative substitution thereof, such as (meth)acrylamide, N-hydroxymethyl (meth)acrylamide, diacetone acrylamide, and N,N-dimethylacryl (meth)amide.

As described above, it is preferable that carboxylic acid monomer be not used as the core polymer, it is also possible to use carboxylic acid monomer to such an extent that the abrasion resistance of the recorded material can be maintained to be equal to or greater than a predetermined level. Although not particularly limited, examples of the carboxylic acid monomer include a (meth)acrylic acid, a crotonic acid, a maleic acid, a fumaric acid, and an itaconic acid. Among these examples, the (meth)acrylic acid is preferably used. Here, the "carboxylic acid monomer unit" means a polymerizable monomer unit that has a carboxyl group and a polymerizable unsaturated group.

One kind of the above monomer may be used alone, or two or more kinds thereof may be used in combination.

In a case where the core polymer contains the hydrophobic monomer unit, the content of the hydrophobic monomer unit in all constitutional units of the core polymer is preferably equal to or greater than 60% by mass. The content of the hydrophobic monomer unit within the above range tends to lead to a further improvement in the abrasion resistance since a hydrophobic film is formed on the surface of an image recorded on the recording medium by heating processing, for example.

The glass transition temperature of the shell polymer is preferably equal to or greater than 60° C. and equal to or less than 150° C. The glass transition temperature of the shell polymer of equal to or greater than 60° C. makes it possible to eject the polymer particles from a recording head without destroying the core-shell structure when the ink composition is ejected in a high-temperature environment. As a result, since adhesion of the polymer particles in nozzles can further be suppressed, it tends to be possible to further suppress clogging of the nozzles. Also, the glass transition temperature of the shell polymer that is equal to or less than 150° C. tends to lead to further excellent abrasion resistance since the shell polymer can easily be softened on the recording medium. By heating the ink composition on the recording medium at a temperature that is higher than the glass transition temperature of the shell polymer after the ink composition has landed on the recording medium, the core polymer flows out of the softened shell polymer, and a film made of the core polymer and the shell polymer is formed on the recording medium. By the core polymer in the softened state spreading on and adhering to the recording medium at this time, a film with more excellent abrasion resistance after drying tends to be formed.

The glass transition temperature of the shell polymer is higher than the glass transition temperature of the core polymer from a viewpoint of obtaining excellent ejection stability for the ink composition according to the embodiment. From the same viewpoint, a difference between the glass transition temperature of the shell polymer and the glass transition temperature of the core polymer is preferably equal to or greater than 10° C.

The shell polymer is preferably hydrophilic and further preferably has an acid value. In doing so, even in a case where drying of the water in the recording head and on the recording medium advances and occupancy of the organic solvent becomes high, the polymer particles are stably dispersed, and it tends to be possible to further suppress aggregation of the polymer particles. The acid value of the shell polymer is equal to or greater than 20 mgKOH/g and equal to or less than 120 mgKOH/g. The acid value within the numerical range makes it possible to secure sufficient hydrophilicity for the shell polymer.

The acid value of the shell polymer is preferably higher than the acid value of the core polymer. In doing so, since the shell polymer tends to have higher hydrophilicity than that of the core polymer, it is possible to further suppress the aggregation of the polymer and to further enhance the abrasion resistance. From the same viewpoint, it is preferable that the acid value of the shell polymer be equal to or greater than 20 mgKOH/g, the acid value of the core polymer is equal to or less than 15 mgKOH/g, or both the conditions are satisfied. The acid value of the core polymer and the acid value of the shell polymer are obtained by calculation using the types and the amounts of use of the monomer used, respectively. Specifically, the acid value of the core polymer and the acid value of the shell polymer are obtained by the same method as that described in the embodiment which will be described later.

The acid value of the shell polymer is preferably equal to or greater than 20 mgKOH/g and equal to or less than 100 mgKOH/g, more preferably equal to or greater than 35 mgKOH/g and equal to or less than 80 mgKOH/g, and further preferably equal to or greater than 50 mgKOH/g and equal to or less than 60 mgKOH/g from the same viewpoint as that described above.

The shell polymer preferably contains at least an aromatic monomer unit as a constitutional unit. The shell polymer containing the aromatic monomer as a constitutional unit tends to suppress curved ejection though a detailed mechanism of the action is not clear. Since ink droplets are easily curved in a case of small dots, in particular, the curved ejection is suppressed according to an aspect of the invention. Therefore, the aspect of the ink composition according to the embodiment is suitable for a recording head capable of ejecting ink dots with multiple sizes from a single nozzle, in particular. Also, since the shell polymer contains the relatively hard aromatic monomer unit, it tends to be possible to further improve the abrasion resistance of the film formed on the recording medium.

In addition, the shell polymer preferably contains a (meth)acrylate monomer unit and a carboxylic acid monomer unit as constitutional units. Use of such polymer makes it possible to cause a carboxyl group to be present on the surface of the shell polymer. In doing so, the ejection stability tends to be further improved since the dispersion stability of the polymer particles is further improved and the viscosity of the ink composition becomes relatively low. Although not particularly limited, examples of the (meth)acrylate monomer includes hydrophilic (meth)acrylate monomer, hydrophobic (meth)acrylate monomer that has an alkyl group containing 3 or more carbon atoms, and hydrophobic (meth)acrylate monomer that has a cyclic structure. Specific examples of the (meth)acrylate monomer and the carboxylic acid monomer include the same examples described above in connection with the monomer that forms the resin contained in the core polymer. One kind of monomer may be used alone, or two or more kinds thereof may be used in combination.

In a case where the shell polymer contains a carboxylic acid monomer unit and an aromatic monomer unit, a ratio of the aromatic monomer unit with respect to the carboxylic acid monomer (aromatic monomer/carboxylic acid monomer) in the shell polymer is preferably equal to or greater than 0.15. In doing so, it is possible to obtain an ink composition that is well balanced between the improvement in the abrasion resistance by the aromatic monomer and the redispersibility by the carboxylic acid monomer.

In a case where the shell polymer contains a (meth)acrylate monomer unit and an unsaturated carboxylic acid monomer unit, the total content of the (meth)acrylate monomer unit and the unsaturated carboxylic acid monomer unit in all the constitutional unit of the shell polymer is preferably equal to or greater than 20% by mass, more preferably equal to or greater than 30% by mass, and further preferably equal to or greater than 35% by mass. In doing so, since the dispersion stability of the polymer particles is further improved, and the viscosity of the ink composition becomes lower, the ejection stability tends to be further improved.

In a case where the shell polymer contains a hydrophilic monomer unit, the content of the hydrophilic monomer unit in all the constitutional units of the shell polymer is preferably equal to or greater than 20% by mass and equal to or less than 90% by mass, more preferably equal to or greater than 30% by mass and equal to or less than 80% by mass, and further preferably equal to or greater than 35% by mass and equal to or less than 70% by mass. The content of the hydrophilic monomer unit of equal to or greater than the aforementioned lower limit tends to lead to a further improvement in the dispersion stability of the polymer particles in the ink composition since the shell polymer has a hydration property. Since adhesion of the polymer particles to the nozzles can be more effectively suppressed, the ejection stability from the nozzles of the recording head tends to become more satisfactory. In contrast, the content of the hydrophilic monomer unit of equal to or less than the aforementioned upper limit tends to lead to stabile dispersion of the polymer particles and tends to be able to suppress aggregation of the polymer particles even in a where drying of the water in the recording head and on the recording medium advances and the occupancy of the organic solvent increases.

In a case where the shell polymer contains a hydrophobic monomer unit, the content of the hydrophobic monomer unit in all the constitutional units of the shell polymer is equal to or greater than 10% by mass and equal to or less than 80% by mass, more preferably equal to or greater than 20% by mass and equal to or less than 70% by mass, and further preferably equal to or greater than 30% by mass and equal to or less than 65% by mass. The content of the hydrophobic monomer unit of equal to or greater than the aforementioned lower limit tends to lead to stable dispersion of the polymer particles and tends to be able to further suppress aggregation of the polymer particles even in a case where drying of the water in the recording head and on the recording medium advances and the occupancy of the organic solvent increases. In contrast, the content of the hydrophobic monomer unit of equal to or less than the aforementioned upper limit tends to lead to a further improvement in the dispersion stability of the polymer particles in the ink composition since the shell polymer has a hydration property. Also, since adhesion of the polymer particles to the nozzles can be effectively suppressed, the ejection stability from the nozzles of the recording head tends to become more satisfactory.

The amount of aromatic monomer contained in the polymer particles as a constitutional unit is preferably equal to or greater than 10% by mass and equal to or less than 80% by mass (with reference to the total mass of the polymer particles) in a sum of the core polymer and the shell polymer. If the amount of the relatively hard aromatic monomer contained is equal to or greater than 10% by mass, it tends to be possible to further improve the abrasion resistance of the recorded material formed on the recording medium. Also, if the amount of the aromatic monomer contained is equal to or less than 80% by mass, it tends to be possible to further improve the ejection stability.

The average particle size of the polymer particles is preferably equal to or greater than 10 nm and equal to or less than 100 nm, and more preferably equal to or greater than 20 nm and equal to or less than 50 nm. The average particle size of the polymer particles of equal to or less than 100 nm as described above tends to make it easy to obtain excellent glossiness of the recorded material and tends to lead to a more excellent film forming property of the ink composition on the recording medium. The average particle size of the polymer particles of equal to or less than 100 nm tends to further suppress clogging of the nozzles since large lumps are not easily produced by aggregation. Furthermore, the average particle size of the polymer particles of equal to or less than 100 nm tends to make it possible to relatively increase the viscosity of the ink composition and tends to be able to suppress a decrease in the viscosity to such an extent that the ink ejection property becomes unstable even if the temperature of the ink composition rises in the recording head. In contrast, the average particle size of the polymer particles of equal to or greater than 10 nm tends to make it easier to prepare the polymer particles.

The average particle size described herein is a volume-average particle size unless otherwise particularly indicated. As a measurement method, the average particle size can be measured by a particle size distribution measurement apparatus using a laser diffraction scattering method as a measurement principle. Examples of the particle size distribution measurement apparatus include a particle size distribution apparatus (such as Microtrack UPA manufactured by Nikkiso Co., Ltd.).

The mass of the core polymer and the mass of the shell polymer in the polymer particles is preferably in a relationship of (the mass of the core polymer)≤(the mass of the shell polymer), and more preferably in a relationship of (the mass of the core polymer)<(the mass of the shell polymer). It is further preferable that the mass of the core polymer be equal to or greater than 40% by mass and equal to or less than 80% by mass on the assumption that the mass of the shell polymer is 100% by mass. Since this leads to a more satisfactory balance between the mass of the core polymer and the shell polymer, the fixing property of the ink composition becomes more satisfactory, further excellent ejection stability is obtained, and vertical alignment failures tend not to occur. Here, the "vertical alignment failures" means a phenomenon in which ink is partially solidified in a periphery of the nozzles due to ejection for a long time, an ejecting direction is curved, and clear vertical lines cannot be printed during continuous ink ejection.

The content (in terms of solid content) of the polymer particles in the ink composition is preferably equal to or greater than 0.5% by mass and equal to or less than 20% by mass, more preferably equal to or greater than 1.0% by mass and equal to or less than 10% by mass, and further preferably equal to or greater than 1.5% by mass and equal to or less than 5.0% by mass with respect to the total amount (100% by mass) of the ink composition. The content of the polymer particles of equal to or greater than 0.5% by mass tends to lead to more excellent abrasion resistance and adhesiveness. Also, the content of the polymer particles of equal to or less than 20% by mass tends to lead to more excellent ejection stability.

Method of Manufacturing Polymer Particles

A method of manufacturing the polymer particles according to the embodiment is not particularly limited, examples thereof include an emulsion polymerization method using an emulsifier and a method of forming the polymer particles by soap-free polymerization substantially without using an emulsifier, and the method of forming the polymer particles by the soap-free polymerization is preferably used. The soap-free polymerization means a polymerization method of manufacturing core-shell polymer substantially without using an emulsifier. The "emulsifier" described herein means a surfactant used in synthesis. Examples of the soap-free polymerization include polymerization of the polymer particles in presence of 1% by mass or less of emulsifier in a solution. In the soap-free polymerization, shell polymer containing a (meth)acrylic acid monomer unit is formed, and a core is formed inside the shell polymer. In a case where the polymer particles are manufactured by using the soap-free polymerization, the average particle size becomes significantly small, and the ejection stability and the glossiness of the ink composition tend to be further improved.

Although the surfactant used in synthesis is not particularly limited, an anionic surfactant and a nonionic surfactant is suitably used. Although not particularly limited, examples of the anionic surfactant include sodium dodecylbenzenesulfonate, sodium laurate, and an ammonium salt of polyoxyethylene alkyl ether sulfate. Although not particularly limited, examples of the nonionic surfactant include polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide.

Although not particularly limited, a hydrophilic initiator is used as a polymerization initiator used in polymerization, and examples thereof include potassium persulfate, ammonium persulfate, and hydrogen peroxide water.

Although an example of a soap-free polymerization method will be described below, the polymerization method is not limited thereto. For example, ion-exchanged water and a polymerization initiator are poured into a polymerization reaction vessel with a jacket, the pressure inside the polymerization vessel is reduced, and oxygen is removed therefrom. Then, the pressure is raised to the atmospheric pressure with nitrogen, and a nitrogen atmosphere is obtained in the polymerization reaction vessel. First, the temperature in the polymerization reaction vessel is set at a predetermined temperature in the nitrogen atmosphere, a preemulsion solution containing monomer as a constituent of the shell polymer is dropped by a specific amount to cause a polymerization reaction, thereby synthesizing the shell polymer. Then, the core polymer is polymerized by using an air gap of the obtained shell polymer as a polymerization site, thereby synthesizing the polymer particles according to the embodiment. Specifically, the aforementioned monomer mixture containing the hydrophobic monomer is dropped to a water-based dispersion medium containing the shell polymer to polymerize the core polymer, thereby obtaining the polymer particles. In such a case where the shell polymer is used as a polymerization site of the core polymer, it is not necessary to use an emulsifier for the monomer mixture.

Wax

The ink composition according to the embodiment preferably further contains a wax. In a case where the recording head is heated, there is a possibility that the polymer particles are aggregated and stick in conjunction with moisture, clogging of the nozzles of the recording head is caused, and stable ejection is prevented. In contrast, aggregation of the polymer particles when moisture is evaporated tends to be suppressed by containing the wax. In this manner, ejection failures and clogging due to sticking of the polymer particles to the nozzles of the recording head can be suppressed, and thus an ink composition with excellent recording stability can be obtained. The wax tends to suppress the film of the polymer particles from becoming excessively brittle at the time of high-temperature recording. Therefore, the ink composition with abrasion resistance that is not easily degraded even at the time of high-temperature recording can be obtained.

The melting point of the wax is preferably equal to or greater than 70° C. and less than 110° C., and more preferably equal to or greater than 80° C. and equal to or less than 110° C. The melting point within the above range tends to make it possible to obtain a recorded material that exhibits more excellent recording stability and has abrasion resistance that is not easily degraded even at the time of high-temperature recording. The melting point can be measured by a differential scanning calorimeter (DSC). The melting point of the wax can be controlled by adjusting a ratio of a plurality of constitutional units that form the wax.

The average particle size of the wax particles is preferably equal to or greater than 0.02 µm and equal to or less than 0.5 µm, and more preferably equal to or greater than 0.04 µm and equal to or less than 0.3 µm. The average particle size within the above range tends to lead to excellent recording stability and tends to make it possible to obtain abrasion resistance that is not easily degraded even at the time of high-temperature recording. The average particle size can be measured by the same method as that described in connection with the polymer particles.

Although not particularly limited, examples of the wax include a (meth)acrylic wax, a polyolefin wax such as polyethylene wax, and a paraffin wax. Although not particularly limited, examples of the polyethylene wax include an AQUACER593 polyolefin wax (manufactured by BYK), Nopcoat PEM-17 (manufactured by San Nopco Limited), Poriron L787 and Poriron L788 (both of which are manufactured by Chukyo Yushi Co., Ltd.), and Chemipal W4005 (manufactured by Mitsui Chemicals, Inc.). The wax may be synthesized by an ordinary method. One kind of wax may be used alone, or two or more kinds thereof may be used in combination.

The content (in terms of solid content) of the wax in the ink composition is preferably equal to or greater than 0.1% by mass and equal to or less than 2.5% by mass, and more preferably equal to or greater than 0.2% by mass and equal to or less than 1.0% by mass with respect to the total amount (100% by mass) of the ink composition. The content of the wax within the above range tends to lead to more excellent recording stability and tends to make it possible to obtain abrasion resistance that is not easily degraded even at the time of high-temperature recording.

Surfactant

The ink composition preferably further contains a surfactant from a viewpoint of glossiness. Although not particularly limited, examples of the surfactant include an acetylene glycol-based surfactant, a fluorine-based surfactant, and a silicone-based surfactant.

Although the acetylene glycol-based surfactant is not particularly limited, one or more kinds selected from 2,4,7,9-tetrametyl 5-decyne-4,7-diol, an alkylene oxide adduct of 2,4,7,9-tetramethyl 5-decyne-4,7-diol, 2,4-dimethyl 5-decyne-4-ol, ad an alkylene oxide adduct of 2,4-dimethyl 5-decyne-4-ol are preferably used. Although not particularly limited, examples of commercially available products of the acetylene glycol-based surfactant include Olfin 104 series and E series such as Olfin E1010 (names of products manufactured by Air Products Japan, Inc.) and Surfynol 104, 465, 61, and DF110D (names of products manufactured by Nissin Chemical Industry Co., Ltd.). One kind of acetylene glycol-based surfactant may be used alone, or two or more kinds thereof may be used in combination.

Although not particularly limited, examples of the fluorine-based surfactant include perfluoroalyl sulphonate, perfluoroalkyl carboxylate, perfluoroalky-phosphoric acid ester, a perfluoroalkyl ethylene oxide adduct, perfluoroalkyl betaine, and perfluoroalkyl amine oxide compounds. Although not particularly limited, examples of commercially available products of the fluorine-based surfactant include S-144 and S-145 (both of which are names of products manufactured by Asahi Glass Co., Ltd.), FC-170C, FC-430, and Fluorad-FC4430 (all of which are names of products manufactured by Sumitomo 3M Limited), FSO, FSO-100, FSN, FSN-100, and FS-300 (all of which are names of products manufactured by DuPont), and FT-250 and 251 (both of which are names of products manufactured by NEOS Company Limited). One kind of the fluorine-based surfactant may be used alone, or two or more kinds thereof may be used in combination.

Although not particularly limited, examples of the silicone-based surfactant include polysiloxane compounds and polyether-modified organosiloxane. Although not particularly limited, specific examples of commercially available products of the silicone-based surfactant include BYK-306, BYK-307, BYK-333, BYK-341, BYK-345, BYK-346, BYK-347, BYK-348, and BYK-349 (all of which are names of products manufactured by BYK Additives & Instruments) KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all of which are names of products manufactured by Shin-Etsu Chemical Co., Ltd.). One kind of the silicone-based surfactant may be used alone, or two or more kinds thereof may be used in combination.

The content of the surfactant is preferably equal to or greater than 0.05% by mass and equal to or less than 2.5% by mass, and more preferably equal to or greater than 0.05% by mass and equal to or less than 1.5% by mass with respect to the total amount (100% by mass) of the ink composition. The content of the surfactant within the above range tends to lead to a further improvement in wettability of the ink composition that has adhered to the recording medium. Although not limited to surfactants, in an example in which a plurality of kinds of surfactants are contained in the ink composition, the content of the surfactants means the total amount thereof in a case of mentioning the content of the components in the embodiment. The same is true for the other components.

The ink composition can appropriately contain, as other components, various additives such as a solubilizer, a viscosity modifier, a pH regulator, an antioxidant, an antiseptic, an antifungal agent, a corrosion inhibitor, and a chelating agent (such as disodium ethylenediaminetetraacetate) for capturing metal ions that affect dispersion.

Aggregating Liquid

The aggregating liquid according to the embodiment contains an aggregating agent that is capable of aggregating the aforementioned ink composition or increasing the viscosity of the ink composition. The ink composition according to the embodiment exhibits the effects by being used in a recording method, which will be described later, along with the aggregating liquid. The aggregating liquid increases the viscosity of the ink composition or insolubilizes the ink composition by aggregating the components contained in the ink composition due to interaction of the aggregating agent in the aggregating liquid with the ink composition. This makes it possible to prevent landing interference and oozing of the ink composition that is made to adhere later, and lines, fine images, and the like can be uniformly depicted.

Aggregating Agent

Although the aggregating agent is not particularly limited, one kind or two or more kinds selected from a group consisting of organic acids, polyvalent metal salts, and cationic compounds are preferably used. This tends to further suppress irregularity in solid images and bleeding. Examples of components that are aggregated by the aggregating agent among the components contained in the ink composition include the aforementioned pigment, the core polymer and the shell polymer used for the polymer particles, and the wax.

Although the organic acids are not particularly limited, a carboxylic acid is preferably used, and examples thereof include a maleic acid, an acetic acid, a phosphoric acid, an oxalic acid, a malonic acid, and a citric acid. Among these examples, a monovalent or divalent carboxylic acid is preferably used. The containing of such a carboxylic acid tends to lead to a further improvement in the aggregation effect of the polymer and the wax and thus lead to a more excellent color developing property. One kind of the organic acid may be used alone, or two or more kinds thereof may be used in combination.

Although the polyvalent metal salts are not particularly limited, polyvalent metal salts of inorganic acids or polyvalent metal salts of organic acids are preferably used from a viewpoint of more effectively and more reliably exhibiting the effects of the invention. Although not particularly limited, examples of such polyvalent metal salts include alkali earth metals of the group 2 in the periodic table (such as magnesium and calcium), transitional metals of the group 3 in the periodic table (such as lanthanum), and earth metals from the group in the periodic table (such as aluminum), and salts of lanthanides (such as neodymium). As salts of these polyvalent metals, a carboxylate (such as salts of a formic acid, an acetic acid, and a benzoic acid), sulfate, nitrate, chrolide, and thiocyanate are preferably used. Among these examples, one kind or two or more kinds selected from a group consisting of calcium salts or magnesium salts of a carboxylic acid (a formic acid, an acetic acid, and a benzoic acid), calcium salts or magnesium salts of a sulfuric acid, calcium salts or magnesium salts of a nitric acid, calcium chloride, magnesium chloride, and calcium salts or magnesium salts of a thiocyanic acid are preferably used as the polyvalent metal salts. One kind of the polyvalent metal salt may be used alone, or two or more kinds thereof may be used in combination.

Although not particularly limited, examples of the cationic compounds include cationic polymer and water-soluble metal compounds. From a viewpoint of more effectively and more reliably exhibiting the effects of the invention, allylamine-based resin such as polyethyleneimine, polydiallylamine, and polyallylamine, alkylamine polymer, polymer having primary to tertiary amino groups or a quarternary ammonium base described in JP-A-59-20696, JP-A-59-33176, JP-A-59-33177, JP-A-59-155088, JP-A-60-11389, JP-A-60-49990, JP-A-60-83882, JP-A-60-109894, JP-A-62-198493, JP-A-63-49478, JP-A-63-115780, JP-A-63-280681, JP-A-1-40371, JP-A-6-234268, JP-A-7-125411, JP-A-10-193776, and the like are preferably used as the cationic polymer. From the same viewpoint, the weight-average molecular weight of the cationic polymer is equal to or greater than 5,000, and further preferably from 5,000 to 100,000. The weight-average molecular weight of the cationic polymer is measured by a gel permeation chromatography using polystyrene as a standard substance.

The content of the aggregating agent is preferably equal to or greater than 1.0% by mass and equal to or less than 20% by mass, more preferably equal to or greater than 3.0% by mass and equal to or less than 17.5% by mass, and further preferably equal to or greater than 5.0% by mass and equal to or less than 15% by mass with respect to the total amount (100% by mass) of the aggregating liquid. The content of the aggregating agent within the above range tends to further suppress irregularity in solid images and bleeding.

The aggregating liquid used in the embodiment may contain the same surfactant as the aforementioned surfactant used in the ink composition, an organic solvent, and water. Also, various additives such as a solubilizer, a viscosity modifier, a pH regulator, an antioxidant, an antiseptic, anantifungal agent, a corrosion inhibitor, and a chelating agent for capturing metal ions that affect dispersion can be appropriately added as other components to the aggregating liquid.

Recording Method

A recording method according to the embodiment can be roughly divided into two forms. A first form of the recording method in the embodiment (hereinafter, referred to as a "first recording method") include an adhesion process of causing the ink composition according to the embodiment and the aforementioned aggregating liquid to adhere to a recording medium. Here, the adhesion process preferably includes an aggregating liquid adhesion process of causing the aggregating liquid to adhere to the recording medium and an ink composition adhesion process of causing the ink composition to adhere to the recording medium. In the adhesion process, the ink composition adhesion process may be provided after the aggregating liquid adhesion process, the aggregating liquid adhesion process may be provided after the ink composition adhesion process, or the aggregating liquid adhesion process and the ink composition adhesion process may be provided at the same time. By using the first recording method, it is possible to improve abrasion resistance and image quality (suppression of bleeding) of the obtained recorded material while maintaining excellent ejection stability. According to the first recording method of the embodiment, it is possible to obtain a recorded material with excellent glossiness in addition to excellent ejection stability, abrasion resistance, and image quality (suppression of bleeding).

Another form of the recording method in the embodiment (hereinafter, referred to as a "second recording method") includes an aggregating liquid adhesion process of causing an aggregating liquid to adhere to a recording medium and an ink composition adhesion process of causing an ink composition containing a color material, water, an organic solvent, and polymer particles to adhere to the recording medium with a surface temperature of equal to or less than 38° C. In the ink composition used in the second recording method, the organic solvent includes an organic solvent with a standard boiling point of equal to or greater than 150° C. and equal to or less than 250°, and the content of the organic solvent that is an alkyl polyol with a standard boiling point of equal to or greater than 280° C. is equal to or less than 2.0% by mass and preferably equal to or less than 0.5% by mass with respect to the total amount of the ink composition. By using the second recording method, it is possible to improve abrasion resistance and image quality (suppression of bleeding) of the obtained recorded material while maintaining excellent ejection stability. According to the second recording method of the embodiment, it is possible to obtain a recorded material with glossiness in addition to excellent ejection stability, abrasion resistance, and image quality (suppression of bleeding). That is, according to the second recording method, it is possible to improve abrasion resistance and image quality (suppression of bleeding) of the obtained recorded material while maintaining excellent ejection stability as compared with a recording method in the related art without limiting the polymer particles to those with the aforementioned core-shell structure, by setting the surface temperature of the recording medium to be equal to or less than 38° C. in addition to the conditions that in the ink composition used, the organic solvent includes an organic solvent with a standard boiling point of equal to or greater than 150° C. and equal to or less than 250° C., the content of the organic solvent that is an alkyl polyol with a standard boiling point of equal to or greater than 280° C. is equal to or less than 2.0% by mass, preferably equal to or less than 0.5% by mass with respect to the total amount of the ink composition.

The polymer particles in the second recording method preferably contain at least an aromatic monomer unit as a constitutional unit. The shell polymer containing the aromatic monomer as a constitutional unit tends to lead to more excellent ejection stability.

Since the color material, the water, the organic solvent, the polymer particles, and arbitrarily used components contained in the ink composition in the second recording method may be the same as those in the ink composition according to the embodiment other than the aforementioned point, detailed description is omitted here. Also, the second recording method can be configured in the same manner as the first recording method other than the aforementioned configuration as a feature of the second recording method. However, the second recording method can be an independent method from the first recording method.

Hereinafter, the aggregating liquid adhesion process and the ink composition adhesion process in the first and second recording methods will be described together.

Aggregating Liquid Adhesion Process

The aggregating liquid adhesion process is a process of causing the aggregating liquid to adhere to the recording medium. Although a mechanism for causing the aggregating liquid is not particularly limited, roller coating, spray coating, or ink jet method can be used, for example. Among these examples, the aggregating liquid is preferably made to adhere by the ink jet method. By causing the aggregating liquid to adhere by the ink jet method, variations in image quality on a medium tend to be suppressed, and abrasion resistance tends to be further improved.

The amount of adhesion of the aggregating liquid to the recording medium is preferably equal to or greater than 0.01 mg/inch$^2$ and equal to or less than 1.0 mg/inch$^2$, more preferably equal to or greater than 0.01 mg/inch$^2$ and equal to or less than 0.50 mg/inch$^2$, and further preferably equal to or greater than 0.01 mg/inch$^2$ and equal to or less than 0.1 mg/inch$^2$ in terms of solid content. The amount of adhesion within the above range tends to further suppress irregularity in solid images and a dotted ruled line pattern of the obtained recorded material.

In a case of providing the ink composition adhesion process after the aggregating liquid adhesion process, a time interval after completion of the aggregating liquid adhesion process to start of the ink composition adhesion process is preferably equal to or less than 10 seconds, more preferably equal to or greater than 0.10 seconds and equal to or less than 10 seconds, further preferably equal to or greater than 0.10 seconds and equal to or less than 8.0 seconds, particularly preferably equal to or greater than 0.10 seconds and equal to or less than 5.0 seconds, and most preferably equal to or greater than 0.10 seconds and equal to or less than 3.0 seconds. If the time interval from the completion of the aggregating liquid adhesion process to the start of the ink composition adhesion process is equal to or less than 10 seconds, reaction efficiency between the aggregating liquid and the ink composition tends to be further improved, and image quality of the obtained recorded material tends to be further improved. When the thickness of the film formed by the ink composition is thin, in particular, the time interval is preferably short. In the aggregating liquid adhesion process, the aggregating liquid may be made to adhere to the recording medium that has been heated in the same manner as in a primary heating process performed in the ink composition adhesion process which will be described later. In such a case, the surface temperature of the recording medium is preferably set to the same temperature as that in the primary heating process.

Ink Composition Adhesion Process

The ink composition adhesion process is a process of causing the ink composition to adhere to the recording medium and can be provided at the same time of the aforementioned aggregating liquid adhesion process or before or after the aggregating liquid adhesion process. However, the ink composition adhesion process is preferably provided after the aggregating liquid adhesion process from a viewpoint of more effectively and reliably exhibiting effects of the invention. Although a mechanism of causing the ink composition to adhere is not particularly limited, roller coating, spray coating, or an ink jet method can be used, for example. Among these examples, the ink composition is preferably made to adhere by the ink jet method. By causing the ink composition to adhere by the ink jet method, variations in image quality on a medium tend to be suppressed, and abrasion resistance tends to be further improved.

From a viewpoint of further enhancing the abrasion resistance, the ink composition adhesion process is preferably a process of causing the ink composition to adhere to a heated recording medium. That is, it is preferable to provide a process of heating the recording medium during the ink composition adhesion process or before the ink composition adhesion process. The above process is also preferably performed in order to quickly dry the ink composition that has adhered to the recording medium, suppress bleeding, and improve image quality. The process of heating the recording medium in the process of causing the ink composition to adhere is also referred to as the primary heating process. The surface temperature of the heated recording medium is preferably equal to or greater than 25° C. (normal temperature), more preferably equal to or greater than 30° C., further preferably equal to or greater than 32° C., and stilly further preferably equal to or greater than 35° C. while the lower limit thereof is not limited. Also, the surface temperature is preferably equal to or less than 80° C., more preferably equal to or less than 60° C., further preferably equal to or less than 50° C., particularly preferably equal to or less than 40° C., and more particularly preferably equal to or less than 38° C. while the upper limit thereof is not limited. The second recording method may be performed in the same manner as in the first recording method other than that the surface temperature in the ink composition adhesion process is equal to or less than 38° C. According to the second recording method, it is possible to obtain excellent ejection stability, abrasion resistance, image quality (suppression of bleeding), and glossiness even on the recording medium with the recording surface temperature is equal to or less than 38° C. by using the aforementioned ink composition and the aggregating liquid.

The thickness of a dried film after a recorded region where the ink composition and the aggregating liquid have been made to adhere is dried preferably ranges from 0.10 to 3.0 μm, more preferably ranges from 0.10 to 2.0 μm, and further preferably ranges from 0.10 to 1.0 μm. The thickness of the dried film of equal to or greater than 0.10 μm tends to further suppress irregularity in solid images and a dotted ruled line pattern of the obtained recorded material. Also, the thickness of the dried film of equal to or less than 3.0 μm tends to further suppress variations in glossiness of the obtained recorded material. Here, the "recorded region" means a region where the image is formed on the surface of the recording medium.

The amount of adhesion of the polymer particles to the recording medium is preferably equal to or greater than 0.01 mg/inch$^2$ and equal to or less than 0.75 mg/inch$^2$, more preferably equal to or greater than 0.02 mg/inch$^2$ and equal to or less than 0.6 mg/inch$^2$, and further preferably equal to or greater than 0.05 mg/inch$^2$ and equal to or less than 0.5 mg/inch$^2$ in terms of solid content. The amount of adhesion of equal to or greater than 0.01 mg/inch$^2$ tends to further suppress irregularity in solid images and a dotted ruled line pattern of the obtained recorded material. The amount of adhesion of the polymer particles to the recording medium of equal to or less than 0.75 mg/inch$^2$ tends to lead to more excellent glossiness of the obtained recorded material.

Recording Medium

Examples of the recording medium include an absorbable recording medium, a low-absorbable recording medium, and a non-absorbable recording medium. Among these examples, the recording medium is preferably a low-absorbable recording medium or a non-absorbable recording medium. In a case of using the low-absorbable recording medium or the non-absorbable recording medium, the aggregating liquid is repelled on the surface thereof, and the aggregating agent is not easily uniformly applied. Therefore, irregularity in solid images and bleeding tend to occur. However, the ink composition can prevent the aggregating liquid from being repelled in the embodiment, which is particularly useful. Also, in the case of using the low-absorbable recording medium or the non-absorbable recording medium, the aggregating agent does not penetrate through the recording medium and tends to remain on the surface of the recording medium. Therefore, the recoded surface tends to become sticky, and the abrasion resistance tends to be degraded. However, it is possible to reduce the amount of the aggregating liquid used by using the aforementioned ink composition and to thereby improving the stickiness of the recording surface in the embodiment, which is particularly useful.

Here, the "low-absorbable recording medium" or the "non-absorbable recording medium" means a recording medium that absorbs 10 mL/m$^2$ or less of water after start of contact until 30 msec in the Bristow method. The Bristow method is a method that has most widely been distributed as a method of measuring the amount of absorbed liquid for a short period of time and has also been employed by JAPAN TAPPI (Japan Technical Association of the Pulp and Paper Industry). Details of the test method are described in Standard No. 51 "Paper and sheet paper-liquid absorbability test method-Bristow method" in "JAPAN TAPPI paper pulp test method 2000".

The non-absorbable recording medium or the low-absorbable recording medium can be classified by wettability with respect to water on the recording surface. Specifically, the recording medium can be characterized by dropping 0.5 μL of water droplets to the recording surface of the recording medium and measuring a falling rate of a contact angle (comparison between a contact angle at 0.5 milliseconds after landing and a contact angle at 5 seconds). More specifically, the non-absorbable property of the "non-absorbable recording medium" indicates the falling rate of less than 1%, and the low-absorbable property of the "low-absorbable recording medium" indicates the falling rate of equal to or greater than 1% and less than 5% as characteristics of the recording medium. The absorbable property indicates the falling rate of equal to or less than 5%. The contact angle can be measured by using a portable contact angle meter PCA-1 (manufactured by Kyowa Interface Science Co., Ltd.).

Although not particularly limited, examples of the absorbable recording medium include a plain paper such as an electrophotographic paper against which the ink composition exhibits high permeability, an ink jet paper (an ink jet-dedicated paper provided with an ink absorbing layer formed of silica particles or alumina particles or an ink absorbing layer formed of hydrophilic polymer such as polyvinyl alcohol (PVA) or polyvinyl pyrolidone (PVP)), an art paper, against which the ink composition exhibits relatively low permeability, which is used for typical offset printing, a coat paper, and a cast paper.

Although not particularly limited, examples of the low-absorbable recording medium includes a coated paper provided with a coated layer for receiving oil-based ink on the surface thereof. Although not particularly limited, examples of the coated paper include print papers such as an art paper, a coat paper, and a mat paper.

Although not particularly limited, examples of the non-absorbable recording medium include a plastic film with no ink absorbing layer and a recording medium with a base material, such as a paper, coated with plastic or including a plastic film bonded thereto. Examples of the plastic described herein include polyvinyl chloride, polyethyleneterephthalate, polycarbonate, polystyrene, polyurethane, polyethylene, and polypropylene.

In addition to the above recording media, plates of metals such as iron, silver, copper, and aluminum, ink non-absorbable or low-absorbable recording medium such as glass can be used.

In particular, the recording medium is preferably in a roll shape. The roll-shaped recording medium can be used in a configuration in which the recording head is scanned once relative to the recording medium for recording and the recording medium is wound around a winding roller. In a case of using such a recording medium and performing recording a plurality of times for a reason that the number of coloring ink types is large and all the colors cannot be recorded by feeding the ink once, it is possible to obtain a recorded material by repeating an operation of scanning the recording head once relative to the recording medium and winding the recording medium with the winding roller a plurality of times. However, since the recording medium is in the roll shape, cracking tends to easily occur in a layer formed of polymer in the recorded material. In a case where cracking occurs, image quality of the obtained recorded material tends to be degraded for the reason that the aggregating liquid penetrate through the cracking. However, cracking is not easily caused in the film formed of the ink composition obtained by the recording method according to the embodiment. Therefore, the invention is particularly useful in a case of using the recording medium with such a shape.

Recording Apparatus

Next, description will be given of a recording apparatus that can be used in the recording method according to the embodiment. FIGURE is a side view illustrating an overall outline of an example of an ink jet recording apparatus 1 that can be used in the embodiment. As illustrated in FIGURE, the ink jet recording apparatus 1 includes a recording medium feeding unit 10, a transport unit 20, a recording unit 30, a drying device 90, and a discharge unit 70.

Among these components, the drying device 90 includes a first drying unit 40 that dries the aggregating liquid and a second drying unit 50 that dries the recorded material obtained by the recording method according to the embodiment.

The feeding unit 10 is provided so as to be able to feed a roll-shaped recording medium F to the transport unit 20. Specifically, the feeding unit 10 includes a roll medium holder 11, and the roll medium holder 11 holds the roll-shaped recording medium F. Then, the recording medium F can be fed to the transport unit 20 on a downstream side in a feeding direction Y by rotating the roll-shaped recording medium F.

Furthermore, the transport unit 20 is provided so as to be able to transport the recording medium F, which has been fed by the feeding unit 10, to the recording unit 30. Specifically, the transport unit 20 includes a first feeding roller 21 and is configured to be able to further transport the fed recording medium F to the recording unit 30 on the downstream side in the feeding direction Y.

The recording unit 30 is provided so as to be able to apply the aggregating liquid to the recording medium F fed by the transport unit 20, eject the ink composition, and perform recording. Specifically, the recording unit 30 includes heads 31 and 32 that perform the aggregating liquid adhesion process, a recording head 33 that performs the ink composition adhesion process, and a platen 34 as a medium support unit.

Among these components, the platen 34 is provided so as to be able to support the recording medium F from the rear surface. The platen 34 is provided with the first drying unit 40 that dries the aggregating liquid that has adhered to the recording medium F and the ink composition that has adhered to the recording medium F. Furthermore, a second feeding roller 43 is provided on the downstream side in the feeding direction Y beyond the platen 34. In addition, the second feeding roller 43 is configured to be able to feed the recording medium F after the recording to the second drying unit 50 on the downstream side in the feeding direction Y.

The second drying unit 50 is configured so as to be able to further dry the aggregating liquid that has adhered to the recording medium F and the ink composition that has adhered to the recording medium F. Furthermore, a third feeding roller 65 is provided in the vicinity of an exit 64 of the second drying unit 50. The third feeding roller 65 is disposed so as to be in contact with the rear surface of the recording medium F and is configured so as to be able to feed the recording medium F to the discharge unit 70 on the downstream side in the feeding direction Y. A process of further drying the aggregating liquid that has adhered to the recording medium F and the ink composition that has adhered to the recording medium F by heating the recording medium is referred to as a secondary heating process. The surface temperature of the recording medium in the secondary heating process preferably ranges from 50 to 200° C., more preferably ranges from 60 to 150°, and further preferably ranges from 70 to 120° C. for obtaining excellent abrasion resistance of the recorded material and preventing thermal deformation of the recording medium.

Furthermore, the discharge unit 70 is provided so as to be able to further feed the recording medium F, which has been fed by the second drying unit 50, toward the downstream side in the feeding direction Y and discharge the recording medium F to the outside of the ink jet recording apparatus 1. Specifically, the discharge unit 70 includes a fourth feeding roller 71, a fifth feeding roller 72, a sixth feeding roller 73, a seventh feeding roller 74, and a winding roller 75. Among these components, the fourth feeding roller 71 and the fifth feeding roller 72 are disposed so as to be in contact with the surface of the recording medium F. In addition, the sixth feeding roller 73 and the seventh feeding roller 74 are disposed so as to form a pair of rollers. The winding roller 75 is provided so as to wind the recording medium F that has been discharged by the sixth feeding roller 73 and the seventh feeding roller 74.

EXAMPLES

Hereinafter, specific description will be given of the invention with reference to examples. The invention is not limited to the following examples. In the following description, the "polymer particles with a core-shell structure" will be referred to as a "core-shell-type polymer particles".

Materials for Aqueous Dispersion of Core-Shell-Type Polymer Particles

Styrene (Tg: 80° C.)
n-butyl acrylate (Tg: −55° C.)
Methyl acrylate (Tg: 10° C.)
Methyl methacrylate (Tg: 105° C.)
Acrylic acid (Tg: 106° C.)

Preparation of Aqueous Dispersion of Core-Shell-Type Polymer Particles

A reactor provided with a dropping device, a thermometer, a water-cooled reflux condenser, and a stirrer was prepared. 100 parts by mass of ion-exchanged water is poured into the reactor, and 0.2 parts of ammonium persulfate as a polymerization initiator was added thereto at 70° C. in a nitrogen atmosphere while stirring the mixture. Then, a monomer solution containing 13.5 parts by mass of styrene, 12.0 parts by mass of methyl acrylate, 21.0 parts by mass of methyl methacrylate, and 3.5 parts by mass of acrylic acid was prepared. The monomer solution was dropped into the reactor to polymerize and prepare shell polymer. Thereafter, a mixture solution of 0.2 parts by mass of potassium persulfate, 35.0 parts by mass of styrene, and 15.0 parts by mass of n-butyl acrylate was dropped into the reactor, and a polymerization reaction was caused while the mixture was stirred at 70° C. Thereafter, the mixture was neutralized with sodium hydroxide, pH thereof was adjusted within a range from 8 to 8.5, and the mixture was filtered by a 0.3 μm filter, thereby preparing an aqueous dispersion (polymer particles A) of core-shell-type polymer particles.

Polymer particles B to I were prepared by the same method as that for preparing the polymer particles A other than that the containing rates (unit: part by mass) of monomer forming shell polymer and core polymer were changed as illustrated in Table 1. As for the polymer particles (E, G) for which components forming the shell polymer and the core polymer are not described, single-layered polymer particles were prepared by causing a polymerization reaction in a single stage without polymerizing and preparing the shell polymer.

Average Particle Size

The polymer particles obtained as described above were measured by a "Microtrack UPA" (Nikkiso Co., Ltd.), and average particle sizes $\phi$ (nm) of the core-shell-type polymer particles were obtained.

Acid Value

For the polymer particles, acid values of the core polymer were obtained by the following equation:

the acid value (mgKOH/g) of the core polymer=acrylic acid used for the core polymer (parts by mass)/entire core polymer (parts by mass)/72.06×56.11×1000

The acid values of the shell polymer were obtained by the same equation as that described above other than that the core polymer in the above equation was replaced with the shell polymer.

Tg

For the polymer particles obtained as described above, differential scanning calorimetry (DSC) based on JIS K7121 was performed, and glass transition temperatures (Tg, unit: ° C.) of polymer forming the core polymer and polymer forming the shell polymer were respectively obtained. A model number "DSC6220" manufactured by Seiko Electronics Co., Ltd. was used for the differential scanning calorimeter.

Table 1 shows the content the rates of the respective monomer, the average particle sizes, the acid values, and Tg of the polymer particles A to I.

TABLE 1

| | | Polymer particles | | | | | | | | |
|---|---|---|---|---|---|---|---|---|---|---|
| | | A | B | C | D | E | F | G | H | I |
| Core | Styrene | 35.0 | 34.3 | 35.0 | 35.0 | — | 35.0 | 35.0 | 35.0 | 35.0 |
| | n-butyl acrylate | 15.0 | 15.0 | 15.0 | 15.0 | — | 15.0 | 15.0 | 15.0 | 15.0 |
| | Acrylic acid | 0 | 0.7 | 0 | 0 | — | 0 | 0 | 0 | 0 |
| Shell | Styrene | 13.5 | 14.5 | 13.5 | 13.5 | 27.0 | 13.5 | — | 13.5 | 7.0 |
| | Methyl acrylate | 12.0 | 12.0 | 12.0 | 12.0 | 24.0 | 12.0 | — | 12.0 | 18.0 |
| | Methyl methacrylate | 21.0 | 21.0 | 21.0 | 21.0 | 42.0 | 21.0 | — | 21.0 | 21.0 |
| | Acrylic acid | 3.5 | 2.5 | 3.5 | 3.5 | 7.0 | 0.8 | — | 1.4 | 3.5 |
| Physical properties | Average particle size [nm] | 35 | 35 | 200 | 35 | 35 | 35 | 35 | 35 | 35 |
| | Content of core polymer [% by mass] | 50 | 50 | 50 | 50 | — | 50 | 100 | 50 | 50 |
| | Content of shell polymer [% by mass] | 50 | 50 | 50 | 50 | 100 | 50 | — | 50 | 50 |
| | Acid value of core polymer [mgKOH/g] | 0 | 11 | 0 | 0 | — | 0 | 0 | 0 | 0 |
| | Acid value of shell polymer [mgKOH/g] | 55 | 39 | 55 | 55 | 55 | 13 | — | 23 | 55 |
| | Tg of core polymer [° C.] | 24.7 | 24.9 | 24.7 | 24.7 | — | 24.7 | 24.7 | 24.7 | 24.7 |
| | Tg of shell polymer [° C.] | 91.9 | 91.4 | 91.9 | 91.9 | 91.9 | 91.1 | — | 91.3 | 92.0 |

Preparation of Pigment Dispersion

First, a reactor provided with a stirrer, a thermometer, a reflux tube, and a dropping funnel was substituted with nitrogen. Thereafter, 20 parts by mass of benzyl methacrylate, 5.0 parts by mass of 2-ethylhexyl methacrylate, 15 parts by mass of butyl methacrylate, 10 parts by mass of lauryl methacrylate, 2.0 parts by mass of methacrylic acid, and 0.3 parts of t-dodecyl mercaptan were poured into the reactor and were then heated at 70° C. Then, a separately prepared mixture of 150 parts by mass of benzyl methacrylate, 15 parts by mass of acrylic acid, 50 parts by mass of butyl methacrylate, 1.0 parts by mass of t-dodecyl mercaptan, 20 parts by mass of methyl ethyl ketone, and 1.0 parts by mass of azobisisobutyronitrile was poured into the dropping funnel, and a polymerization reaction of the dispersed polymer was caused while the mixture was dropped into the reactor for 4 hours. Then, methyl ethyl ketone was added to the reactor to prepare a dispersed polymer solution with a concentration of 40% by mass.

40 parts by mass of the dispersion polymer solution, 30 parts by mass of chromofine blue C.I. Pigment Blue 15:3 (a name of a product manufactured by Dainichiseika Color & Chemicals Mfg. Co., Ltd.) as a cyan pigment, 100 parts by mass of 0.1 mol/L aqueous sodium hydroxide solution, and 30 parts by mass of methyl ethyl ketone were mixed, and 8-pass dispersion processing was performed by an Altimizer 25005 (manufactured by Sugino Machine Limited). 300 parts by mass of ion-exchanged water was added to the obtained mixture, the entire amount of methyl ethyl ketone and a part of water were distilled away by using a rotary evaporator, and then the mixture was neutralized with 0.1 mol/L sodium hydorixde to adjust pH thereof to pH9. Then, dispersion was made to advance until the volume-average particle size became 100 nm while the volume-average particle size of the cyan pigment was measured by a particle size distribution measurement apparatus, the mixture was filtered with a 3.0 μm membrane filter, and a pigment dispersion with a solid content (the dispersed polymer and the pigment) of 20% by mass was obtained.

Materials for Ink Composition

Main materials for the ink composition that were used for producing the following recorded materials were as follows.

Color Material
  Above dispersion solution
Organic Solvent
  1,2-hexanediol (standard boiling point: 223° C.)
  Propylene glycol (standard boiling point: 188° C.)
  2-purolidone (standard boiling point: 245° C.)
  Glycerin (standard boiling point: 290° C.)

Polymer Particles
  Aqueous dispersions A to I of core-shell-type polymer particles
Wax
  AQUACER 593 (a name of a product manufactured by BYK)
Surfactant
  BYK348 (a name of a product manufactured by BYK)

Preparation of Ink Composition

The respective materials were mixed to have compositions illustrated in Table 2 shown below and were sufficiently stirred to obtain ink compositions. In Table 2 shown below, the unit of numerical values is % by mass, and the total thereof is 100.0% by mass.

TABLE 2

| Ink composition | | 1 | 2 | 3 | 4 | 5 | 6 | 7 | 8 | 9 |
|---|---|---|---|---|---|---|---|---|---|---|
| Pigment dispersion | | 2.0 | 2.0 | 2.0 | 2.0 | 2.0 | 2.0 | 2.0 | 2.0 | 2.0 |
| Organic solvent | 1,2-hexanediol | 5.0 | 5.0 | 5.0 | 5.0 | 5.0 | 5.0 | 5.0 | 5.0 | 5.0 |
| | Propylene glycol | 5.0 | 5.0 | 5.0 | 0.0 | 5.0 | 5.0 | 5.0 | 5.0 | 5.0 |
| | 2-pyrolidone | 10.0 | 10.0 | 10.0 | 10.0 | 10.0 | 10.0 | 10.0 | 10.0 | 10.0 |
| | Glycerin | 0.0 | 0.0 | 0.0 | 5.0 | 0.0 | 0.0 | 0.0 | 0.0 | 0.0 |
| Polymer particles | Type | A | B | C | D | E | F | G | H | I |
| | content | 3.0 | 3.0 | 3.0 | 3.0 | 3.0 | 3.0 | 3.0 | 3.0 | 3.0 |
| Wax | | 0.5 | 0.5 | 0.5 | 0.5 | 0.5 | 0.5 | 0.5 | 0.5 | 0.5 |
| Surfactant | | 1.0 | 1.0 | 1.0 | 1.0 | 1.0 | 1.0 | 1.0 | 1.0 | 1.0 |
| Pure water | | Residual amount | Residual amount | Residual amount | Residual amount | Residual amount | Residual amount | Residual amount | Residual amount | Residual amount |

Materials for Aggregating Liquid

Main materials for the aggregating liquid used for producing the following recorded materials were as follow:

Aggregating Agent
  Magnesium Sulfate
  Allylamine-based resin (manufactured by Nittobo Medical Co., Ltd., product name "PAA-HCL-01")
Solcent
  Propylene glycol
  2-pyrolidone
Surfactant
  BYK348 (a name of a product manufactured by BYK)

Preparation of Aggregating Liquid

The respective materials were mixed to have compositions illustrated in Table 3 shown below and were sufficiently stirred to obtain aggregating liquids. In Table 3 shown below, the unit of numerical values is % by mass, and the total thereof is 100% by mass.

TABLE 3

| Aggregating liquid | | 1 | 2 |
|---|---|---|---|
| Aggregating agent | Magnesium sulfate | 10.0 | — |
| | Allylamine-based resin | — | 10.0 |
| Solvent | Propylene glycol | 10.0 | 10.0 |
| | 2-pyrolidone | 15.0 | 15.0 |
| Surfactant | | 5.0 | 5.0 |
| Pure water | | Residual amount | Residual amount |

Production of Recorded Material

An ink jet printer as a modified machine of PX-G930 (a name of a product manufactured by Seiko Epson Corporation) with a heater attached to a platen was prepared, and the surface temperature of the recording medium at the platen was adjusted by the heater so as to be the primary heating temperatures illustrated in Tables 4 and 5. Then, the recording medium was transported to the printer, and the aggregating liquid in the head was applied by the ink jet method under conditions that resolution was 720×720 dpi and the amount of adhesion was 1.7 mg/inch². Then, the ink composition in the recording head was applied to surface to which the aggregating liquid has adhered under conditions that the resolution was 720×720 dpi and the amount of adhesion was 12 mg/inch², thereby obtaining a recorded material on the recording medium. Thereafter, the recording medium was discharged from the printer and was left dried in an environment at 80° C. for 10 minutes (secondary heating). However, the condition of the secondary heating was changed from 80° C. to 25° C. (normal temperature) in Recording Example 19. As the recording medium, a coat paper (product name "PET50A PL SIN" manufactured by Lintec Corporation) was used.

Abrasion Resistance

The obtained recorded material was tested by applying a load of 300 g by using a friction element obtained by attaching a white cotton cloth (according to JIS L 0803) to a Gakushin type friction fastness tester AB-301 (a name of a product manufactured by Tester Sangyo Co., Ltd.) until the recorded material peeled off or until 30 round trips were completed. Then, peeling of the recorded material from the recording medium was visually observed, and abrasion resistance was evaluated based on the following evaluation criteria. Obtained results will be shown in Tables 4 and 5.

Evaluation Criteria

A: Neither scratch nor peeling of the recorded material was observed.
B: Scratch or peeling of the recorded material was observed in less than 20% of the rubbed area (stroke area).
C: Scratch or peeling of the recorded material was observed in equal to or greater than 20% and less than 50% of the rubbed area (stroke area).
D: Scratch or peeling of the recorded material was observed in equal to or greater than 50% and less than 90% of the rubbed area (stroke area).
E: Scratch or peeling of the recorded material was observed in equal to or greater than 90% of the rubbed area (stroke area).

Glossiness

For recorded materials produced by the same method as that in the above "Production of recorded material" other than that a solid pattern of 10×10 mm was produced, 20° glossiness degree based on JIS Z8741 was measured by a glossiness degree measurement machine (GM-268Plus manufactured by Konica Minolta Inc.), and glossiness was evaluated. A larger value of the glossiness degree means more excellent glossiness. Obtained results (glossiness degrees) will be shown in Tables 4 and 5.

Image Quality (Bleeding)

In recorded materials produced by the same method as that in the above "Production of recorded material" other than that a solid pattern of 10×10 mm was produced, bleeding was visually observed, and image quality (irregularity in solid images) was evaluated by the following evaluation criteria. Obtained results will be shown in Tables 4 and 5.

Evaluation Criteria

A: No bleeding was observed inside and at the outline of the solid pattern.
B: Bleeding was observed at the outline of the solid pattern though no bleeding was observed inside the solid pattern.
C: A slight amount of bleeding was observed not only at the outline of the solid pattern but also inside the solid pattern.
D: Bleeding was observed at the outline of the solid pattern, and bleeding exceeding the slight amount was observed inside the solid pattern.

Ejection Stability

After the above "Production of recorded material", nozzle clogging was observed, and ejection stability was evaluated by the following evaluation criteria. Obtained results will be shown in Tables 4 and 5.

Evaluation Criteria

A: No clogging was observed, or clogging was eliminated by performing head cleaning once.
B: Although clogging was not eliminated by performing the head cleaning once, the condition become better by performing the head cleaning twice or three times.
C: Clogging was not eliminated even by performing the head cleaning three times.

TABLE 4

|  | Recording method | | | | |
|---|---|---|---|---|---|
|  | Recording example 1 | Recording example 2 | Recording example 3 | Recording example 4 | Recording example 5 |
| Primary heating temperature | 40° C. | 40° C. | 40° C. | 40° C. | 40° C. |
| Ink composition | Ink composition 1 | Ink composition 2 | Ink composition 3 | Ink composition 4 | Ink composition 5 |
| Aggregating liquid | Aggregating liquid 1 | Aggregating liquid 1 | Aggregating liquid 1 | Aggregating liquid 1 | Aggregating liquid 1 |
| Abrasion resistance | B | C | C | D | D |
| Glossiness | 20 | 15 | 10 | 10 | 15 |
| Image quality (bleeding) | A | B | A | D | B |
| Ejection stability | B | B | A | A | B |

TABLE 4-continued

|  | Recording method | | | | |
| --- | --- | --- | --- | --- | --- |
|  | Recording example 6 | Recording example 7 | Recording example 8 | Recording example 9 | Recording example 10 |
| Primary heating temperature | 40° C. | 40° C. | 40° C. | 40° C. | 50° C. |
| Ink composition | Ink composition 6 | Ink composition 7 | Ink composition 8 | Ink composition 9 | Ink composition 4 |
| Aggregating liquid | Aggregating liquid 1 | Aggregating liquid 1 | Aggregating liquid 1 | Aggregating liquid 1 | Aggregating liquid 1 |
| Abrasion resistance | B | B | B | C | D |
| Glossiness | 24 | 25 | 22 | 23 | 10 |
| Image quality (bleeding) | C | C | B | A | B |
| Ejection stability | B | C | B | B | C |

TABLE 5

|  | Recording method | | | | |
| --- | --- | --- | --- | --- | --- |
|  | Recording Example 11 | Recording Example 12 | Recording Example 13 | Recording Example 14 | Recording Example 15 |
| Primary heating temperature | 35° C. | 40° C. | 40° C. | 40° C. | 35° C. |
| Ink composition | Ink composition 1 | Ink composition 1 | Ink composition 4 | Ink composition 1 | Ink composition 7 |
| Aggregating liquid | Aggregating liquid 1 | — | — | Aggregating liquid 2 | Aggregating liquid 1 |
| Abrasion resistance | B | A | D | B | B |
| Glossiness | 24 | 25 | 10 | 24 | 28 |
| Image quality (bleeding) | A | D | D | B | C |
| Ejection stability | A | B | A | B | A |

|  | Recording method | | | |
| --- | --- | --- | --- | --- |
|  | Recording Example 16 | Recording Example 17 | Recording Example 18 | Recording Example 19 |
| Primary heating temperature | 35° C. | 35° C. | 35° C. | 40° C. |
| Ink composition | Ink composition 5 | Ink composition 7 | Ink composition 4 | Ink composition 5 |
| Aggregating liquid | Aggregating liquid 1 | — | Aggregating liquid 1 | Aggregating liquid 1 |
| Abrasion resistance | D | B | D | E |
| Glossiness | 18 | 30 | 13 | 10 |
| Image quality (bleeding) | C | D | D | C |
| Ejection stability | A | A | A | B |

As a result of the evaluation, the ink compositions slowly dried and the abrasion resistance and the image quality were inferior in Recording Examples 4 and 18 of using the ink composition 4 in which the content of the organic solvent that is an alkyl polyol with the standard boiling point of equal to or greater than 280° C. exceeded 2.0% by mass. In Recording Example 10 of similarly using the ink composition 4, the image quality was relatively improved by setting the primary heating temperature to be significantly high while the ejection stability was inferior as an adverse effect thereof. It is not preferable to set the primary heating temperature to be significantly high even from a viewpoint that thermal damage is applied and durability of the head is degraded while the head is used for a long period of time. Excellent image quality of the recorded material is the most important issue in the embodiment, and in this regard, the aforementioned respective examples were inferior since excellent image quality was not able to be achieved without causing any adverse effect.

In Recording Examples 12, 13, and 17 of using no aggregating liquid, image quality was inferior in the same manner as in the aforementioned recording examples.

In contrast, Recording examples 1 to 3, 5 to 9, 11, 14 to 16, and 18 using the ink composition, in which the content of the organic solvent that is an alkyl polyol with the standard boiling point of equal to or greater than 280° C. is equal to or less than 2.0% by mass, and the aggregating liquid were superior to the aforementioned recording examples in which image quality was inferior since at least excellent image quality was achieved in Recording examples 1 to 3, 5 to 9, 11, 14 to 16, and 19.

In Recording examples 5, 16, and 19 of using the ink composition 5 that contained the polymer particles E that was not core-shell-type polymer particles and was made of resin with relatively high Tg among the above examples, the film forming property of the polymer particles on the recording medium and the abrasion resistance were inferior.

In Recording Example 7 using the ink composition 7 that contained the polymer particles G that was not core-shell-type polymer particles and was made of resin with relatively low Tg, ejection stability was inferior. This ejection failure is expected to have been caused by foreign matters formed by welding of the polymer particles in the ink at the head. This can also be expected from the fact that the welding of the polymer particles in the ink was recognized in observation of the ink that adhered to the nozzle plate after the recording, with a microscope.

In Recording Example 15 in which the ink composition 7 was similarly used and the primary heating temperature was set to 35° C. and in Recording Example 16 in which the ink composition 5 was used and the primary heating temperature was set to 35° C., excellent ejection stability was achieved regardless of the fact that the ink compositions containing the polymer particles that were not the core-shell-type polymer particles were used. It was discovered from these results that recording was able to be performed while particularly excellent ejection stability was exhibited by setting the primary heating temperature to be less than 40° C. and that excellent image quality was also able to be achieved by using the aggregating liquid even in the case where an ink composition containing polymer particles that was not core-shell-type polymer particles was used. It is expected that the bleeding was able to be suppressed even at the relatively low primary heating temperature by the effect of suppressing the bleeding of the ink by using the aggregating liquid.

In Recording Examples 1 to 3, 6, 8, 9, 11, and 14 using the ink composition, which contained core-shell-type polymer particles, in which the content of the organic solvent that was an alkyl polyol with the standard boiling point of equal to or greater than 280° C. was equal to or less than 2.0% by mass, particularly excellent abrasion resistance and ejection stability were achieved.

Although not shown in the tables, recording was performed in the same manner as in Recording Examples 11, 15, and 16 other than that the platen heater was turned off and the primary heating temperature at the time of causing the aggregating liquid to adhere and at the time of causing the ink composition to adhere was set to 25° C., and image quality was evaluated as D in all the examples. It was discovered from these results that it was preferable to perform the primary heating process and to set the primary heating temperature to be at least greater than 25° C. for improving image quality.

The entire disclosures of Japanese Patent Application Nos. 2015-241455, filed Dec. 10, 2015 and 2016-212638, filed Oct. 31, 2016 are expressly incorporated by reference herein.

What is claimed is:

1. An ink composition comprising:
   a color material;
   water;
   an organic solvent; and
   polymer particles,
   wherein the organic solvent includes an organic solvent with a standard boiling point of equal to or greater than 150° C. and equal to or less than 250° C., and the content of the organic solvent that is an alkyl polyol with a standard boiling point of equal to or greater than 280° C. is equal to or less than 2.0% by mass with respect to a total amount of the ink composition,
   wherein the polymer particles have a core-shell structure including core polymer and shell polymer, and a glass transition temperature of the shell polymer is in the range of 60° C. to 150° C., a glass transition temperature of the core polymer is greater than 0° C. and less than 60° C., and when a mass of the shell polymer is 100%, a mass of the core polymer is equal to or greater than 40% by mass and equal to or less than 80% by mass,
   wherein the ink composition is used for a recording method using the ink composition and an aggregating liquid containing an aggregating agent that is capable of aggregating components of the ink composition or increasing viscosity of the components of the ink composition, and
   wherein the shell polymer contains at least an aromatic monomer unit as a constitutional unit.

2. The ink composition according to claim 1,
   wherein the content of the organic solvent with the standard boiling point of equal to or greater than 280° C. is equal to or less than 0.5% by mass with respect to a total amount of the ink composition.

3. The ink composition according to claim 1,
   wherein an acid value of the shell polymer is larger than an acid value of the core polymer.

4. The ink composition according to claim 1,
   wherein at least one of a condition that an acid value of the shell polymer is equal to or greater than 20 mgKOH/g and a condition that an acid value of the core polymer is equal to or less than 15 mgKOH/g is satisfied.

5. The ink composition according to claim 1,
   wherein a difference between the glass transition temperature of the core polymer and the glass transition temperature of the shell polymer is equal to or greater than 10° C.

6. The ink composition according to claim 1,
   wherein the aggregating agent is one kind or two or more kinds selected from a group consisting of polyvalent metal salts, organic acids, and cationic compounds.

7. A recording method comprising:
   causing the ink composition according to claim 1 to adhere to a recording medium; and
   causing an aggregating liquid containing an aggregating agent that is capable of aggregating components of the ink composition or increasing viscosity of the components of the ink composition to adhere to the recording medium.

8. A recording method comprising:
   causing the ink composition according to claim 2 to adhere to a recording medium; and
   causing an aggregating liquid containing an aggregating agent that is capable of aggregating components of the ink composition or increasing viscosity of the components of the ink composition to adhere to the recording medium.

9. A recording method comprising:
   causing the ink composition according to claim 3 to adhere to a recording medium; and
   causing an aggregating liquid containing an aggregating agent that is capable of aggregating components of the ink composition or increasing viscosity of the components of the ink composition to adhere to the recording medium.

10. A recording method comprising:
causing the ink composition according to claim 4 to adhere to a recording medium; and
causing an aggregating liquid containing an aggregating agent that is capable of aggregating components of the ink composition or increasing viscosity of the components of the ink composition to adhere to the recording medium.

11. A recording method comprising:
causing the ink composition according to claim 5 to adhere to a recording medium; and
causing an aggregating liquid containing an aggregating agent that is capable of aggregating components of the ink composition or increasing viscosity of the components of the ink composition to adhere to the recording medium.

12. A recording method comprising:
causing the ink composition according to claim 6 to adhere to a recording medium; and
causing an aggregating liquid containing an aggregating agent that is capable of aggregating components of the ink composition or increasing viscosity of the components of the ink composition to adhere to the recording medium.

13. The recording method according to claim 7,
wherein the causing of the ink composition to adhere is causing at least the ink composition to adhere to the recording medium by an ink jet method.

14. The recording method according to claim 7,
wherein the causing of the ink composition to adhere to the recording medium is causing the ink composition to adhere to a heated recording medium.

15. A recording method comprising:
causing an aggregating liquid containing an aggregating agent that is capable of aggregating components of an ink composition or increasing viscosity of the components of the ink composition to adhere to a recording medium; and
causing the ink composition that contains a color material, water, an organic solvent, and polymer particles to adhere to the recording medium with a surface temperature of equal to or less than 38° C., the polymer particles having a core-shell structure where a glass transition temperature of a polymer that forms the shell is in the range of 60° C. to 150° C., a glass transition temperature of a polymer that forms the core is greater than 0° C. and less than 60° C., and when a mass of the shell polymer is 100%, a mass of the core polymer is equal to or greater than 40% by mass and equal to or less than 80% by mass,
wherein in the ink composition, the organic solvent includes an organic solvent with a standard boiling point of equal to or greater than 150° C. and equal to or less than 250° C., and the content of the organic solvent that is an alkyl polyol with a standard boiling point of equal to or greater than 280° C. is equal to or less than 2.0% by mass with respect to a total amount of the ink composition, and
wherein the shell polymer contains at least an aromatic monomer unit as a constitutional unit.

16. The recording method according to claim 15,
wherein the causing of the ink composition to adhere to the recording medium is causing the ink composition to adhere to the recording medium heated to a temperature from 30° C. to 50° C.

* * * * *